United States Patent [19]

Miyaguchi et al.

[11] Patent Number: 5,076,996
[45] Date of Patent: Dec. 31, 1991

[54] SYSTEM FOR MONITORING OPERATING CONDITION OF A CONTROL ROD DRIVE MECHANISM

[75] Inventors: Jinichi Miyaguchi; Yoshinori Takada, both of Kobe; Shinichi Murakawa, Takasago; Hiroshi Yatabe, Kobe, all of Japan

[73] Assignee: Mitsubishi Jukogyo Kabushiki Kaisha, Tokyo, Japan

[21] Appl. No.: 360,030

[22] Filed: Jun. 1, 1989

[30] Foreign Application Priority Data

Jun. 1, 1988 [JP] Japan .................................. 63-71759
Feb. 3, 1989 [JP] Japan .................................. 1-23665

[51] Int. Cl.$^5$ .............................................. G21C 7/00
[52] U.S. Cl. ................................... 376/240; 376/245; 376/258
[58] Field of Search ................ 376/245, 258; 376/240

[56] References Cited

U.S. PATENT DOCUMENTS

| | | | |
|---|---|---|---|
| 3,292,426 | 12/1966 | McCann ................ | 73/71.4 |
| 3,656,074 | 4/1972 | Bevilacqua et al. ............ | 335/206 |
| 3,882,333 | 5/1975 | DeWeese ................ | 310/14 |
| 3,890,607 | 6/1975 | Plenc et al. ................ | 340/199 |
| 3,906,469 | 9/1976 | Kronk ................ | 340/188 |
| 4,094,369 | 6/1978 | Blanc et al. ................ | 177/147 |
| 4,125,432 | 11/1978 | Brooks, Jr. et al. ........... | 176/22 |
| 4,314,881 | 2/1982 | Wu ................ | 376/245 |
| 4,363,778 | 12/1982 | Abbott ................ | 376/228 |
| 4,486,382 | 12/1984 | Gravelle et al. ............ | 376/216 |
| 4,523,466 | 6/1985 | Lubin et al. ................ | 73/579 |
| 4,585,608 | 4/1986 | Day ................ | 376/245 |
| 4,623,507 | 11/1986 | Gravelle ................ | 376/258 |
| 4,719,420 | 1/1988 | Boimond ................ | 324/208 |

FOREIGN PATENT DOCUMENTS

0034517 9/1981 European Pat. Off. .
2287750 5/1976 France .

OTHER PUBLICATIONS

"Vibration Measurements in a Three-Loop Pressurized Water Reactor-Instrumentation, Analysis, and Results"; Dietrich Haensel; ISA Transactions, vol. 11, No. 4 (1972), pp. 299-303.

Primary Examiner—Robert L. Stoll
Assistant Examiner—N. Bhat
Attorney, Agent, or Firm—Wenderoth, Lind & Ponack

[57] ABSTRACT

A system for monitoring an operating condition of a control rod drive mechanism (CRDM) having a pressure housing erectly mounted on a reactor vessel head closure, a vertically movable control rod drive shaft accommodated in the housing and an electromagnetically motive latch mechanism includes an accelerometer fitted to a housing upper end and signal recording means for receiving output signals from the accelerometer through signal processing means and recording the processed output signals. A system for monitoring and analyzing an operating condition of an electromagnetically driven CRDM having a lifting electromagnetic coil, a stationary gripper electromagnetic coil and a movable gripper electromagnetic coil includes a detector, fitted to the CRDM, for detecting vibrations caused by operation of the drive mechanism, a buffer amplifier for receiving current, and detection and control signals, a pre-processing unit for digitalizing these signals, and a processing unit for analytically processing both the current and detection signals.

1 Claim, 9 Drawing Sheets

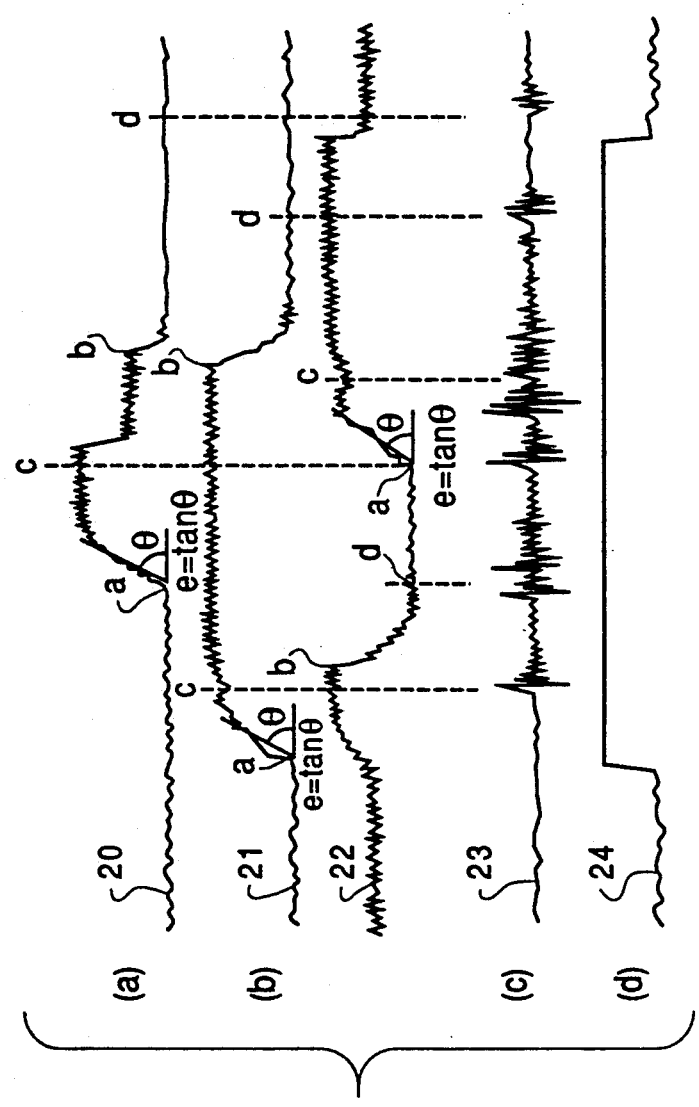
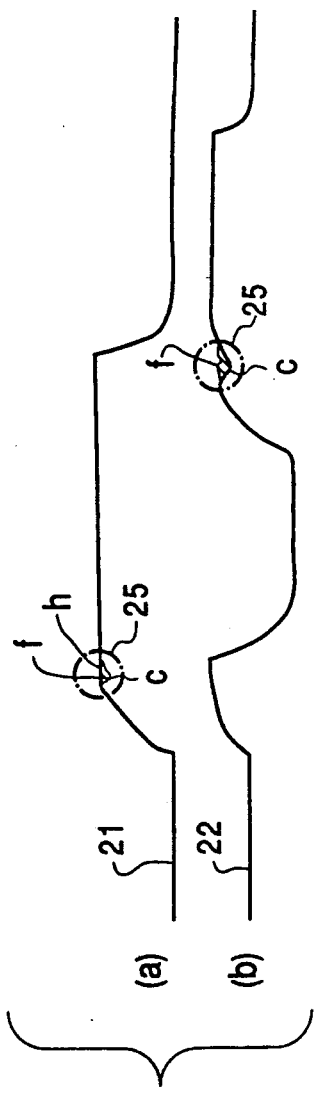
FIG. 5
FIG. 6

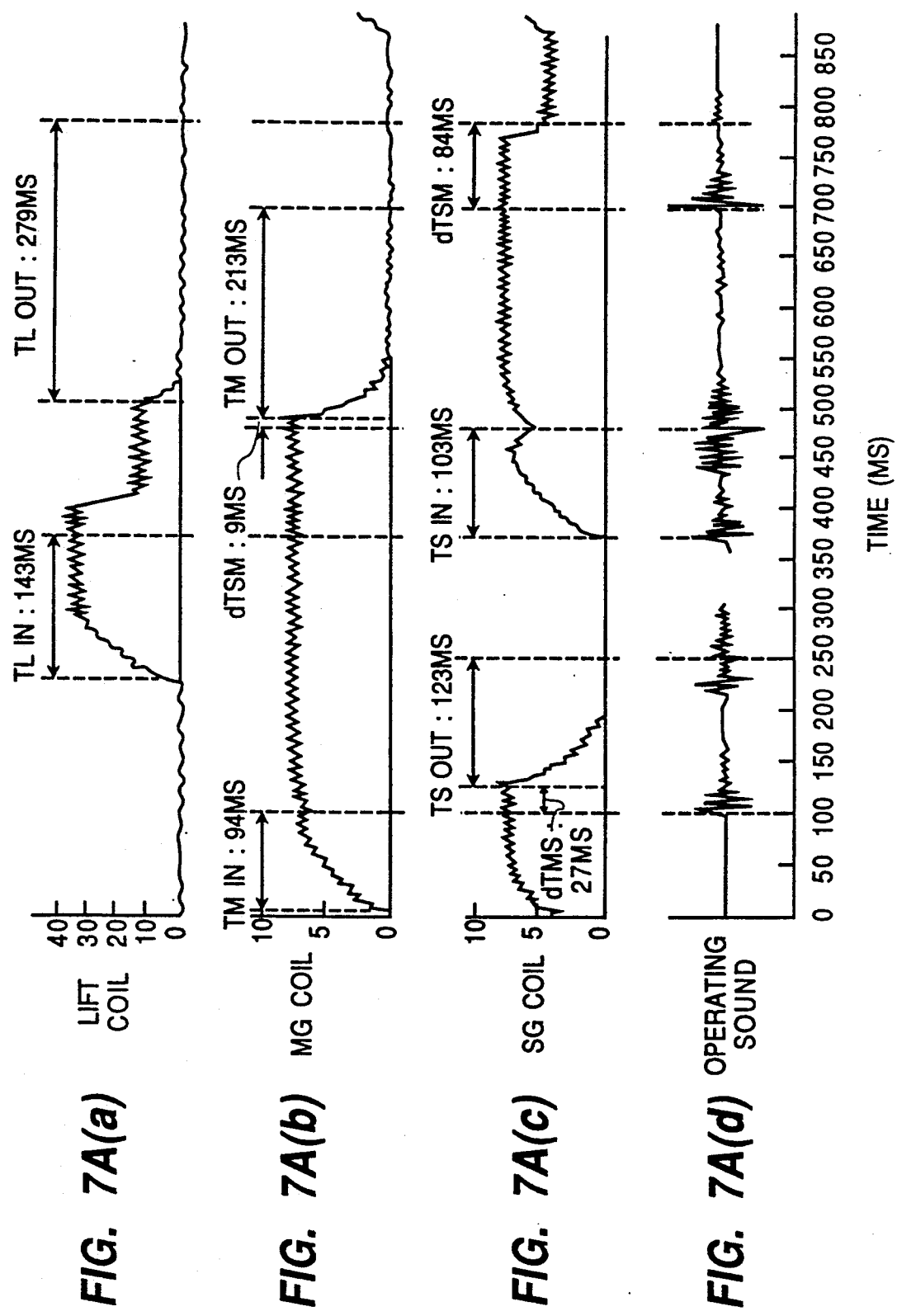

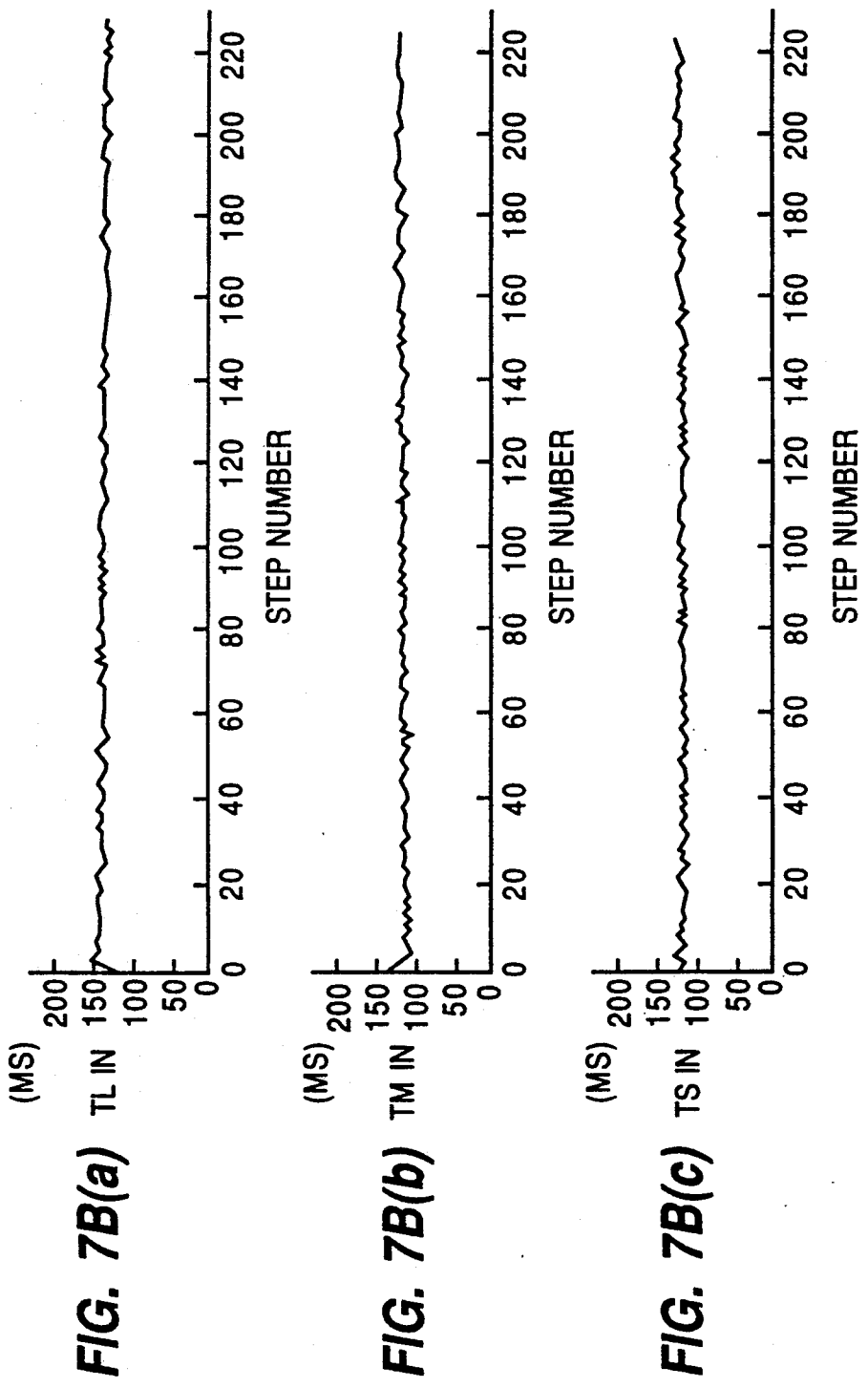

SYSTEM FOR MONITORING OPERATING CONDITION OF A CONTROL ROD DRIVE MECHANISM

BACKGROUND OF THE INVENTION

1. Field of the Invention

The preset invention relates to a system for monitoring an operating condition of a control rod drive mechanism for use with a PWR (Pressurized Water Reactor).

2. Description of the Prior Art

A typical arrangement of a conventional PWR is that a plurality (generally, 33~57 units) of control rod drive mechanisms (hereinafter referred to as CRDMs) 1 . . . are, as depicted in FIG. 8, disposed erectly on an head closure 2 of a reactor vessel in accordance with a rated output of the reactor. Each CRDM 1 is, as illustrated in FIG. 9, composed of a pressure housing mounted on and extending upwardly from the reactor vessel head closure 2, a control rod drive shaft 4 so disposed in the pressure housing 3 as to be movable in a vertical direction, and electromagnetically motive latch mechanisms 5a, 5b and 5c for driving the control rod drive shaft 4 in the up-and-down direction. The electromagnetically motive latch mechanisms 5a, 5b and 5c are intermittently driven by turning ON/OFF a lift coil 6, a coil 7 for a movable gripper and a coil 8 for a stationary gripper in a given sequence which are incorporated in the pressure housing 3, thereby controlling the reactor output by ascending or descending the control rod drive shafts 4. One example of a typical construction of the CRDM is disclosed as a "Linear Motion Device" in Japanese Utility Model Publication No. 35912/1982.

Turning to FIG. 11, there is illustrated the principal portion of the CRDM, i.e., the linear motion device disclosed in the same Utility Model Publication. The CRDM acts to pull out and insert a control rod by gripping a groove chased in the drive shaft 4 connected to the upper part of the control rod. The operation of such a control rod involves the steps of moving up and down a movable magnetic pole 102 referred to as a plunger, and grasping and releasing a latch 103 with a link mechanism. The up-and-down movement of the plunger 102 can be effected by generating magnetic forces while energizing electromagnetic coils 6, 7 and 8 provided on the outer periphery thereof.

In the PWR equipped with the plurality of CRDMs 1 . . . , it is required to constantly monitor whether each CRDM 1 is normally operated or not.

Based on the prior art, a method of monitoring the operating condition of the CRDM 1 comprises the steps of, as illustrated in FIG. 10, mounting a small-sized microphone 9 on the top of the housing 3, detecting sounds emitted when electromagnetically motive latch mechanisms 5a, 5b and 5c depicted in FIG. 9 perform their latch operations by use of the microphone 9, and recording the operating sounds on an unillustrated oscillograph.

There arise, however, the following problems inherent in this method:

(1) The method is not available at high temperatures because of detecting the operating sounds of the electromagnetically motive latch mechanisms 5a, 5b and 5c by use of the microphone 9; and (2) The microphone has such a characteristic as to detect the operating sounds of the adjacent CRDMs, and it is therefore difficult to discriminate the operating sound of the aiming CRDM with the aid of the output of the microphone 9. Especially when the plurality of contiguous CRDMs are operated at the same moment, the electromagnetically motive latch mechanisms 5a, 5b and 5c of each CRDM function with a slight time-difference, and hence the operating sounds recorded on the oscillograph assume consecutively varying waveforms. As a result, it is almost impossible to discriminate the aiming CRDM on the basis of the waveforms recorded on the oscillograph.

The up-and-down movement, illustrated in FIG. 11, of the plunger 102 can be effected by generating the magnetic forces while energizing the electromagnetic coils 6, 7 and 8 attached to the outer periphery thereof. Electric currents flowing through the electromagnetic coils 6, 7 and 8 at this time contain counter electromotive current components corresponding to the operation of the plunger 102. For this reason, an operating condition of the plunger 102 can be detected indirectly by analyzing the operating sound of the plunger 102 which comes into operation in combination with characteristics of coil currents.

Heretofore, the plunger operating condition is also analyzed by utilizing the above-mentioned principle. In this case, as a time for which the CRDM is operated is as high as 780 msec per step, the waveforms of the coil currents and of the operating sound are once inputted to and recorded on the oscillograph, and thereafter the characteristics of the coil current and of the operating sound are analyzed by human operations.

The number of steps required for a stroke of the CRDM, viz., every pull-out and insertion, is given by $228 \times 2 = 456$. For instance, in a pressurized water reactor plant of a 4-loop primary cooling system, where 53 units of CRDMs are prepared, it is required that the data analysis be performed 24168 times, given by $456 \times 53$, for effecting the analysis of all the steps with respect to the entire CRDMs. The human-operation-based analysis needs approximately 20 minutes per step, and hence a large amount of time and also a good number of workers are required for the foregoing number of data analyzing operations. Besides, the analyzing process has no alternative but to depend on the human operations, so that it is impossible to steer clear of an artificial fault. This may inevitably become a factor for causing a mistake in judgement when making a systematic evaluation.

SUMMARY OF THE INVENTION

It is a primary object of the present invention which is made to obviate the foregoing problems to provide a system capable of accurately monitoring an operating condition of a control rod drive mechanism, the system being usable during the operation of a reactor.

To accomplish this object, according to one aspect of the invention, there is provided a system for monitoring an operating condition of a control drive mechanism including: a pressure housing mounted on and extending upwardly from a reactor vessel head closure; a control rod drive shaft disposed on the pressure housing and movable in a vertical direction; and an electromagnetically motive latch mechanism for driving the control rod drive shaft in the up-and-down direction, characterized by comprising: an accelerometer attached to an upper end of the pressure housing; and signal recording means for receiving output signals from the accelerometer through signal processing means and recording the processed output signals.

According to another aspect of the invention, there is provided a system for monitoring and analyzing an operating condition of an electromagnetically driven control rod drive mechanism including: an electromagnetic coil for lifting; an electromagnetic coil for a stationary gripper; and an electromagnetic coil for a movable gripper, these electromagnetic coils being operated under control signals from a control unit for the control rod drive mechanism, the system comprising: a detector attached to the control rod drive mechanism to detect vibrations caused by operation of the drive mechanism; a buffer amplifier receiving current signals from each of the electromagnetic coils, a detecting signals from the detector and the control signal from the control unit; a pre-processing unit for digitalizing the current signal, the detecting signal and the control signal; and a processing unit for processing and analyzing the current signal and detecting signal.

In accordance with a first embodiment of the present invention, the accelerometer of a piezoelectric element type or other type is mounted on the top of the pressure housing, whereby impulse vibrations caused when the electromagnetically motive latch mechanism performs its latch operation can be detected by the accelerometer through the pressure housing. Therefore, the signal outputted from the accelerometer is recorded on signal recording means through a signal processing unit, and an operating condition of the aiming CRDM can thereby be detected from the recorded waveforms.

In accordance with a second embodiment of the present invention, transmitted to the buffer amplifier and isolated therein are the current signals of the respective electromagnetic coils, the vibration detecting signal from the detector and the control signal from the control unit. Subsequently, these signals are pre-processed by the pre-processing unit and converted into digital values.

In order to accurately analyze the characteristics of the coil currents as well as of the vibrations, a cycle at which to take in the signals may be set to an adequate sampling time (e.g., 0.5~1.0 msec).

The thus converted signals are inputted to an processing unit, wherein in accordance with predetermined analysis processing programs per step there are computed a variety of operating elements or pieces of operating information on the signals of the vibrations and individual coil currents, i.e., a period from turning-ON of the coil current to completion of closing the plunger of each coil, a period from turning-OFF of the coil current to completion of opening of the plunger, an inclination at which the current rises, and a magnitude of distortion of the current waveform which is generated due to the operation of the plunger.

The processed results can be displayed in a variety of forms on a CRT display or on a printer plotter.

BRIEF DESCRIPTION OF THE DRAWINGS

Other objects and advantages of the invention will become apparent during the following discussion in conjunction with the accompanying drawings, in which:

FIG. 1 is a perspective view illustrating the top of a pressure housing;

FIG. 2 is a block diagram depicting a construction of a signal processing unit in accordance the first embodiment;

FIGS. 5(a), 5(b), 5(c) and 5(d) are graphic charts showing pieces of extracted information and signal waveforms of operating sounds and of respective coil currents inputted to an operation analyzer in the second embodiment of the present invention;

FIGS. 6(a) and 6(b) are graphic charts showing the extracted information and the current signals of FIGS. 5(b) and 5(c) after passing through a filter;

FIGS. 7A(a), 7A(b), 7A(c) and 7A(d) are graphic charts indicating the analyzed results of a variety of characteristics of one step while being overlapped with the input signals shown in FIGS. 5(a), 5(b), 5(c) and 5(d);

FIGS. 7B(a), 7B(b) and 7B(c) are graphic charts showing some trends of the analyzed results of the characteristics depicted in FIG. 7A.

DESCRIPTION OF THE PREFERRED EMBODIMENTS

Figure 1:
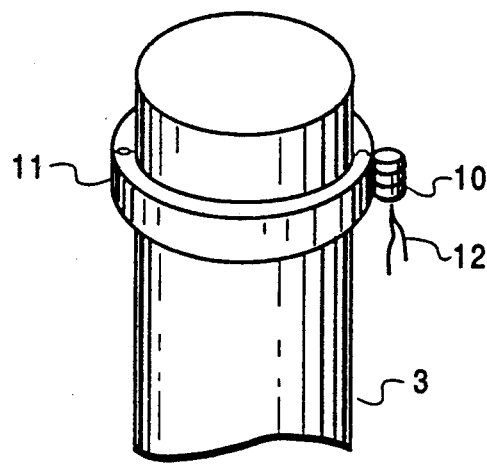
FIGS. 1 and 2 in combination show a first embodiment of the present invention.
Figure 2:
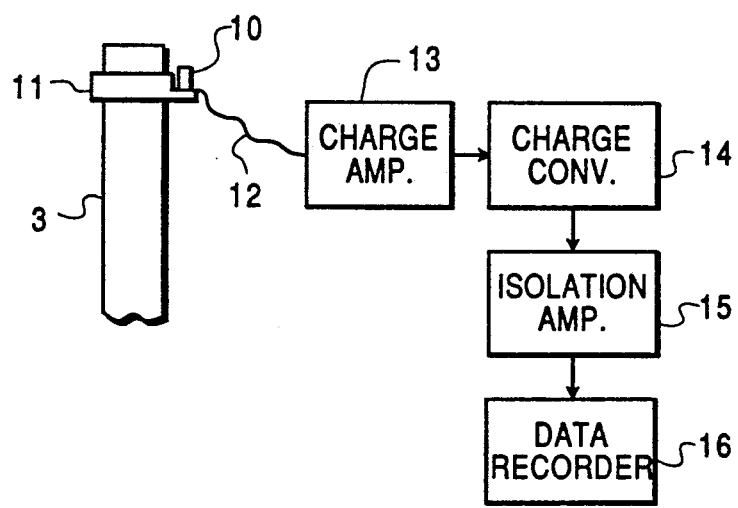
Figure 3:
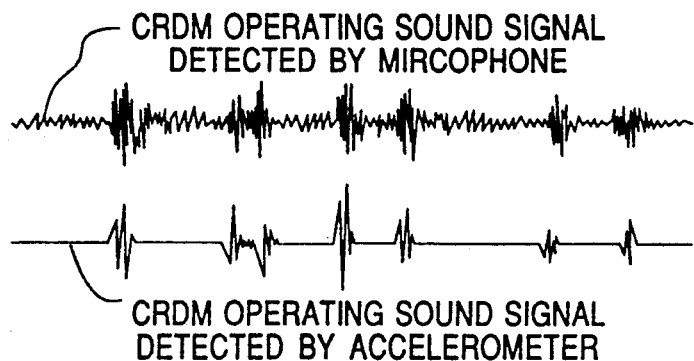
FIG. 3 is a waveform diagram showing detection outputs when detecting an operating condition of a CRDM both with a microphone and with a piezoelectric element type accelerometer.
Figure 8:
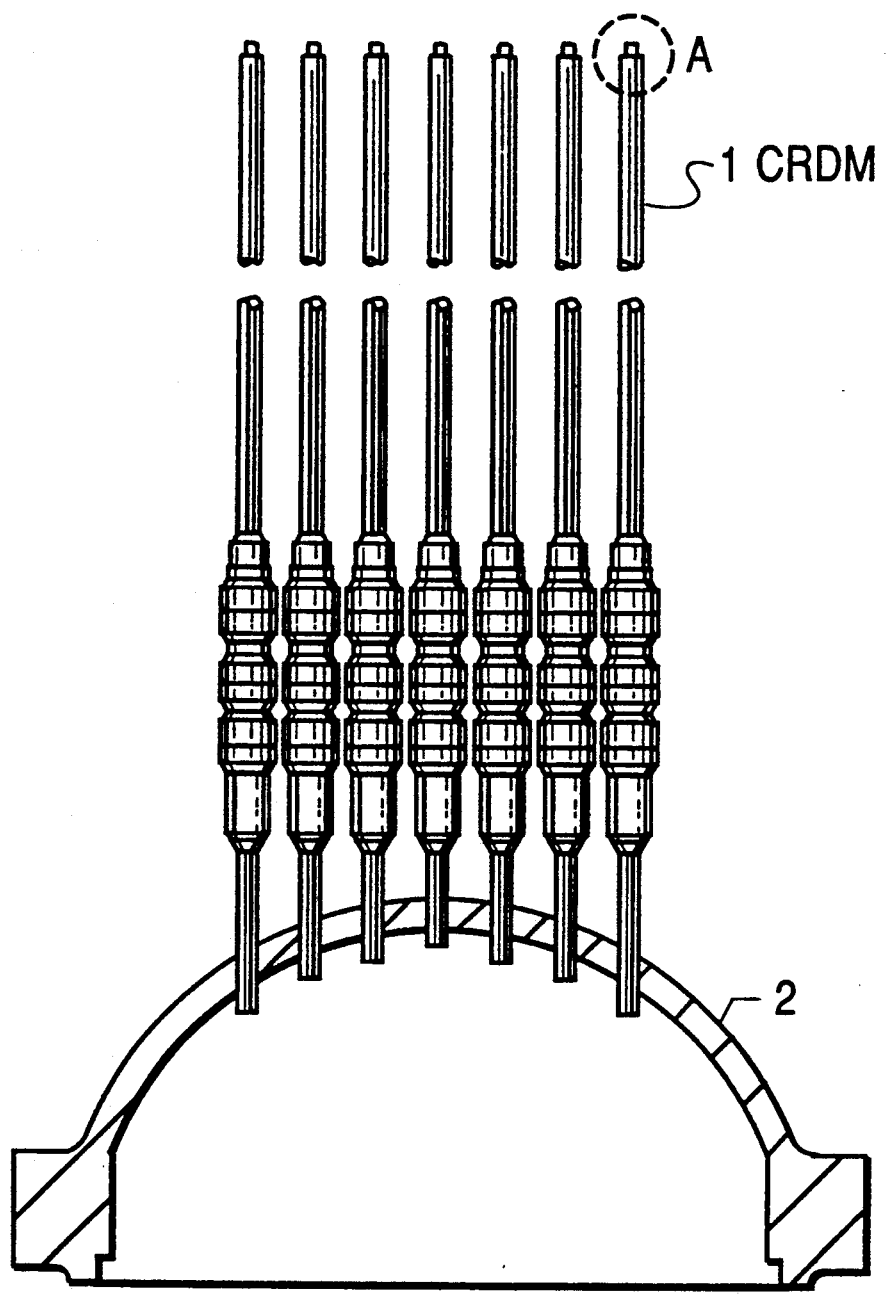
FIG. 8 is a vertical sectional view depicting a reactor vessel head closure in a conventional PWR (Pressurized Water Reactor)
Figure 9:
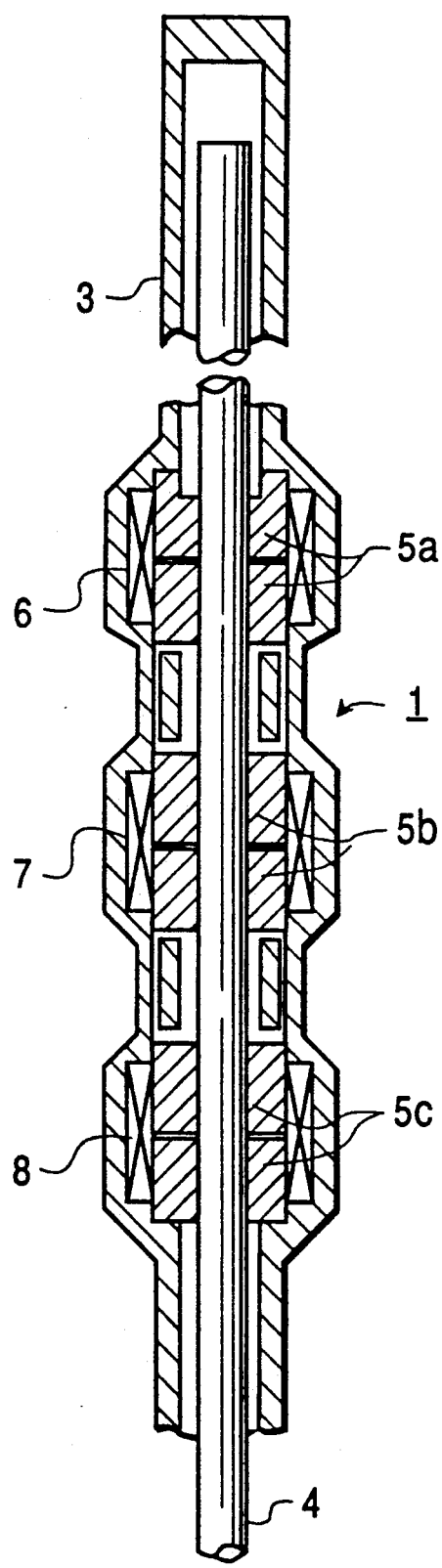
FIG. 9 is a vertical sectional view depicting an interior structure of the conventional CRDM.
Figure 10:
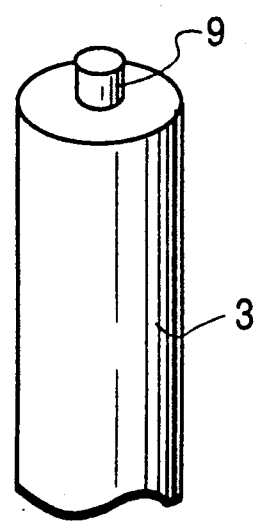
FIG. 10 is a view fully illustrating a part A of FIG. 8.

Referring to FIGS. 1 to 3, there is shown a first embodiment of the present invention. In the following discussion, the same components as those of a prior art system depicted in FIGS. 8 and 9 are marked with the like symbols.

FIG. 1 shows the first embodiment of the present invention. A piezoelectric element type accelerometer generally designated at 10 is mounted through a ring-like fitting jig 11 on the top of a pressure housing 3 of each CRDM extending upwards from a reactor vessel head closure 1. The accelerometer 10 is, as illustrated in FIG. 2, connected via a lead wire 12 to a charge amplifier 13. The accelerometer 10 has directivity with respect to detection sensibility and is so mounted that the detection sensibility coincides with the axial direction of the pressure housing 3.

The charge amplifier 13 serves to impart an adequate gain to an acceleration signal outputted from accelerometer 10. The acceleration signal amplified by the charge amplifier 13 is converted by a charge converter 14 into an equivalent acceleration signal, and thereafter inputted to an isolation amplifier 15. The isolation amplifier 15 connected between the charge converter 14 and a data recorder 16 behaves to prevent the intermixing of noise caused by multipoint grounding.

In this way, the accelerometer 10 is mounted on the top of the pressure housing 3, with the result that impulse vibrations caused when electromagnetically motive latch mechanisms 5a, 5b and 5c cf the CRDM 1 perform their latch operations can be detected by accelerometer 10 through the pressure housing 3. The acceleration signal outputted from the accelerometer 10 is recorded on the data recorder 16 through the charge amplifier 13, the charge converter 14 and the isolation amplifier 15. Consequently, an operating condition of each CRDM can be detected from the recorded waveforms.

Because the accelerometer 10 is fitted to the top of the pressure housing 3, even when the plurality of adjacent CRDMs simultaneously function, the operating condition of the aiming CRDM can accurately be detected. More specifically, the impulse vibrations of the contiguous CRDMs are conveyed via the reactor vessel head closure 2 to the pressure housing 3 of the aiming CRDM, and hence the vibrations come to attenuate when reaching the top of the pressure housing 3. Besides, there is produced a time lag in transmission. It is therefore possible to readily discriminate the impulsive vibrations of the aiming CRDM from those of the adjacent CRDMs.

Turning to FIG. 3, there is illustrated output waveforms when detecting the operating conditions of the CRDMs both with a microphone 9 and with the accelerometer 10. As depicted in FIG. 3, where the operating condition of the CRDM is detected by means of the microphone 9, the output of the microphone 9 is intermixed with the operating sounds of other CRDMs, so that it is difficult to monitor the operating condition of the aiming CRDM from the output waveforms of the microphone 9. Whereas in the monitoring of the operating condition of the CRDM by use of the accelerometer 10, the output of the accelerometer 10 is not intermixed with the impulse vibrations of other CRDMs, and it follows that the operating condition of the aiming CRDM can precisely be detected.

The accelerometer 10 is usable at relatively high temperatures, and hence the operating condition of the CRDM can be monitored during the reactor operation. Moreover, if a proper analyzing method is adopted, faults can also be detected by a computer.

The description will next fully deal with a second embodiment of the present invention with reference to FIGS. 4 through 7.

Figure 4:
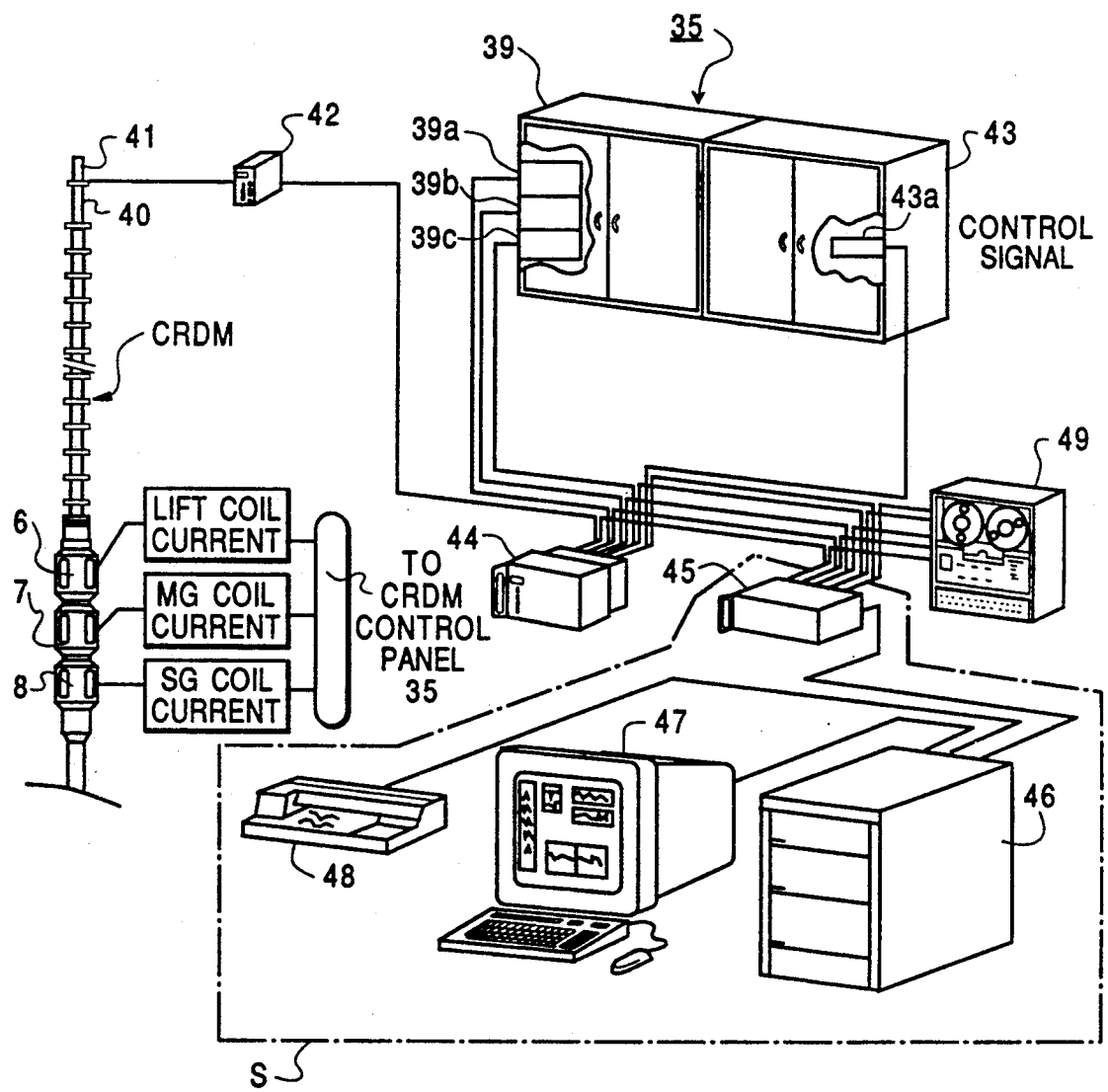
FIG. 4 is a schematic perspective view showing a second embodiment of the present invention.
Figure 11:
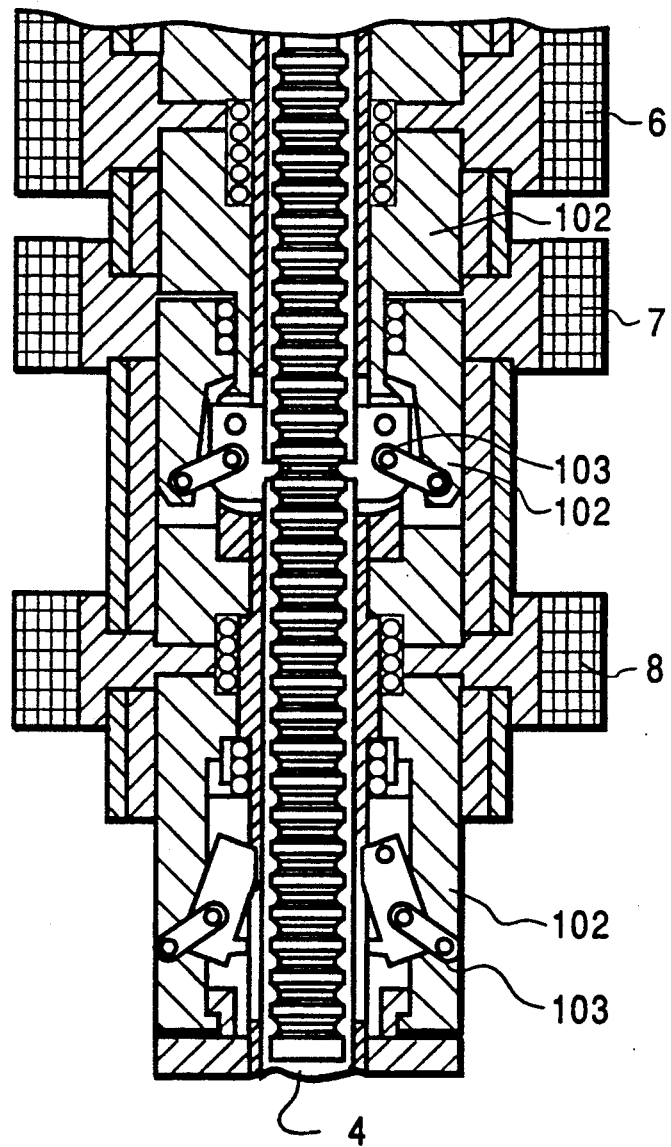
FIG. 11 is a vertical sectional view showing one example of the CRDM of PWR in the prior art.

FIG. 4 is a conceptual view showing a case where an operation analyzer according to the present invention is applied to a pressurized water type nuclear power plant to monitor on-line the operation. A control rod drive mechanism (CRDM) shown on the left side of the Figure may be classified as a type disclosed in Japanese Utility Model Publication No. 35912/1982, the CRDM comprising an electromagnetic coil (lift coil) 6 for lifting, an electromagnetic coil (MG coil) 7 for a movable gripper, and an electromagnetic coil (SG coil) 8 for a stationary gripper, these coils being accommodated in a pressure housing 40 extending upwards from a reactor vessel head closure. Now the function will be explained in brief. During a steady period before operating the CRDM, a drive shaft 4 (see FIG. 11) is retained by the SG coil 8. For example, when raising the drive shaft 4, the MG coil 7 is excited by a control signal which will be mentioned later, and upon sufficient excitation, the SG coil 8 is released from the excitation. Subsequently the lift coil 6 is excited, whereby the drive shaft 4 is raised by one step. The SG coil 8 is in turn excited. Upon sufficient excitation, the MG coil 7 and the lift coil 6 are released from the excitation, thus completing one step.

Electric currents of the thus operated coils 6 to 8 are fed to a control panel (control unit) 35 of the CRDM; and they are fetched as equivalent voltage signals from monitor signal terminals 39a, 39b and 39c of a power cabinet 39 thereof. An operating sound of the CRDM is fetched as a detection signal from an accelerometer (detector for the operating sound) 41 attached to a CRDM housing 40 through a charge amplifier 42. A control signal of the CRDM is fetched from a test point terminal 43a in a logic cabinet 43 of the CRDM control panel 35. These signals passing through a buffer amplifier 44 are isolated, and thereafter inputted to a CRDM operation monitoring system S.

The operation monitoring system S consists of a pre-processing unit 45 composed of an unillustrated channel converter and an analog/digital converter, an arithmetic processing unit 46 conceived as a computer connected to the pre-processing unit 45, a CRT display unit 47 connected to the arithmetic processing unit 46, and a printer plotter 48. The voltage signal indicating the coil current, the detection signal indicating the CRDM operating sound and the CRDM control signal are digitalized in the pre-processing unit 45, and then transferred to the arithmetic processing unit 46, where the characteristics of these signals are analyzed in accordance with an analysis processing program. The analytical results are outputted to the CRT display unit 47 and/or the printer plotter 48. Designated at 49 is a data recording unit to which the input signal to the operation monitoring system S is also transferred in parallel for recording and storage thereof.

Referring next to FIGS. 5(a)-5(d) and 6(a)-(b), the analysis processing program will briefly be described. In FIG. 5(a)-(d), the lift coil current, the MG coil current, the SG coil current, the operating sound (detection) signal and the control signal are expressed in waveforms indicated at 20, 21, 22, 23 and 24, respectively. In accordance with the analysis processing program, a timing point a at which the coil current is inputted and a timing point b at which the coil current is cut off are obtained with respect to each coil from the input signals 20~22. Furthermore, a timing point c at which a plunger 102 (see FIG. 11) completes a blockading operation is sought from current distortion referred to as a dip 25 (see FIG. 6(a)) as well as from the operating sound signal 23. A timing point d at which the plunger 102 completes a releasing operation is sought from the operating sound signal 23. Let e (e=tan $\theta$) denote an inclination at which the coil current rises till reaching a steady state after the coil current has been inputted, and an amount of distortion of the dip 25 is obtained in the form of an area f in connection with the MG coil current 21 and the SG coil current 22. Note that the control signal 24 is employed as a trigger signals for initiating the analysis. The analysis processing program will readily be, it seems, understood to those skilled in the art from the explanations which have been given above or will hereinafter be made, and therefore the flowchart may be omitted.

Next, the criteria for extraction of the timing points a~3 from the foregoing signal waveforms will be described:

(1) A propos of the timing points a and b, they are obtained as the points where a proper level which can arbitrarily be set is cut by the current signals;

(2) The timing point c of the lift coil current 20 is sought as an initial point at which the coil current exceeds a proper level which can be set at discretion within a range of an arbitrarily settable proper time width. In the case of the MG coil current signal 21 and the SG coil signal 22, AC components or noise components which are present in the signal waveforms are at first eliminated by means of a filter device (not illustrated) to accurately extract the characteristics of the coil currents. The next process is to obtain a timing point of initially taking the minimum value during a period from the timing point a at which the coil current is inputted to the timing point b at which the coil current is cut off. If an operating sound is present at the thus obtained timing point, this timing point may be defined as a point c at which the plunger has completely performed the blockading operation. The judgement of the presence or non-presence of the operating sound involves the step of permitting the aforementioned timing point to have a time width of approximately +5 msec to extract a generation timing point of the operating sound corresponding to the operation of each plunger, and hence depends on whether or not there exists an operating sound signal which exceeds a proper level arbitrarily settable within a range of this time width. Note that the AC components may be removed in pre-processing by use of a mechanical filter device but may also be eliminated by a digital filter based on a 3-point sequential mean value after temporarily taking the signal in the arithmetic processing unit 46 in order to keep the synchronism with other signals;

(3) The timing point d is likewise obtained as an initial point at which the operating sound signal exceeds an arbitrarily settable proper level after providing such a level and also an arbitrarily settable time width;

(4) The rising inclination e of the current signal is obtained as an inclination of a rectilinear line which connects the timing point a to points at which the individual coil current signals become 30%, 50% and 70% of a steady current value; and (5) The area f of the dip 25 is obtained as an area defined by the current waveform and a rectilinear line h drawn in parallel with a timing axis from a point at which to take the maximum value in front of the timing point c with respect to the SG coil and the MG coil which have undergone the filter process.

In the second place, the timing points a~d extracted on the basis of the above-mentioned criteria are converted into the following time differences as various characteristics relative to the operations of the plungers. The thus converted time differences are outputted to the CRT display unit 47 and/or the printer plotter 48. FIG. 7A(a)-7A(d) show one concrete example of the analytical results of the foregoing characteristics.

TLin: a time difference between the points a and c of the lift coil which indicate a period from the inputting of the lift coil current to the closing of the lift plunger.

TLout: a time difference between the points b and d of the lift coil which indicate a period from the cut-off of the lift coil current to the completion of release of the lift plunger.

TMin: a time difference between the points a and c of the MG coil which indicate a period from the inputting of the MG coil current to the closing of the MG plunger.

TMout: a time difference between the point b and d of the MG coil which indicate a period from the cut-off of the MG coil current to the completion of release of the MG plunger.

TSin: a time difference between the point a and c of the SG coil which indicate a period from the inputting of the SG coil current to the closing of the SG plunger.

TSout: a time difference between the points b and d of the SG coil which indicate a period from the cut-off of the SG coil to the completion of release of the SG plunger.

dTSM: a time difference between the point c of the SG coil and the point b of the MG coil which indicate a period from the closing the SG plunger to the cut-off of the MG coil current.

dTMS: a time difference between the point c of the MG coil and the point b of the SG coil which indicate a period from the closing of the MG plunger to the cut-off of the SG coil current.

dTLM: a time difference between the point d of the MG coil and the point d of the lift coil which indicate a period from the completion of release of the MG plunger to the completion of release of the lift plunger.

Figure 7C:
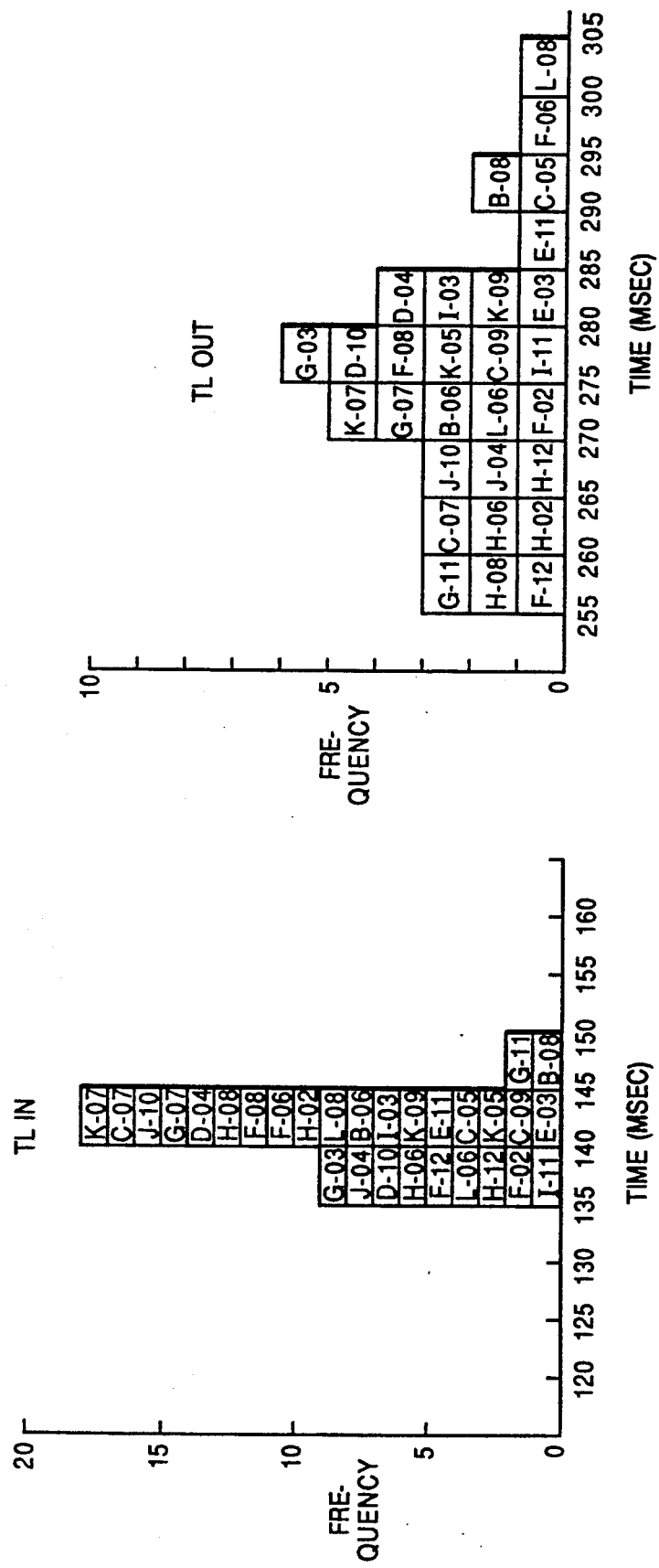
FIGS. 7C(a) and 7C(b) are histograms showing distributions of analyzed mean values obtained with respect to the respective control rod drive mechanisms.

These characteristics TLin, TLout, TMin, TMout and so on can be outputted as shown in the trend diagram of FIGS. 7B(a)-7B(c) for facilitating the understanding of variations in time thereof, and can also be expressed in the form of the histogram of FIGS. 7C(a)-7C(b) illustrating a scatter in operating condition of each CRDM by executing statistical processing.

It is to be noted that in this embodiment the operating sound of the plunger is detected by the accelerometer, but other vibrations caused corresponding to the operation of the plunger may also be detected.

As discussed above, the system for monitoring the operating condition of the CRDM according to the present invention comprises the piezoelectric element type accelerometer mounted on the top of the pressure housing of the CRDM and the signal recording means for recording the signal outputted from the accelerometer through the signal processing unit. Based on this construction, the system is usable during the operation of the reactor and is capable of exactly the operating condition of the aiming CRDM even when the plurality of adjacent CRDMs are simultaneously.

In accordance with the present invention, the characteristics of the coil current signal and the vibration signal of the operating sound of the CRDM can automatically be analyzed at a high velocity with a saving of labor. In addition, it is possible to prevent an artificial mistake and eliminate differences in human judgement between the individuals, thereby ameliorating the reliability on the analytical results.

As explained earlier, since the analyzing process is effected at a high speed, the operating condition of the CRDM can be monitored in real time, and it is feasible to quickly exactly correspond to the abnormality.

Besides, the operating signals of the CRDMs are periodically analyzed on the occasion of regular examinations for confirming the functions of the CRDMs and monthly inspections on the operation of the nuclear power plant. The analyzed results may be available for maintenance of the CRDM drive system by statistically processing these results.

Although the illustrative embodiments of the present invention have been described in detail with reference to the accompanying drawings, it is to be understood that the present invention is not limited to those precise embodiments. Various changes or modifications may be effected therein by one skilled in the art without departing from the scope or spirit of the invention.

What is claimed is:

1. A system for monitoring and operating condition of a control rod drive mechanism including a pressure housing mounted on and extending upwardly from a reactor vessel head closure, a control rod drive shaft disposed in said pressure housing and movable in a vertical direction, and an electromagnetically motive latch mechanism for moving up and down said control rod drive shaft;

said electromagnetically driven control rod control rod drive mechanism comprising:
an electromagnetic coil for lifting;
an electromagnetic coil for a stationary gripper; and
an electromagnetic coil for a movable gripper;
wherein said electromagnetic coils are operated under control signals from a control unit for said control rod drive mechanism;

said system further comprising:
an accelerometer attached to an upper end of said pressure housing for detecting impulse sounds generated by the operation of said electromagnetically motive latch mechanism and for outputting a detecting signal corresponding thereto;
a buffer amplifier for receiving current signals from each of said electromagnetic coils, and a detecting signal from said accelerometer and said control signal from said control unit; and
a processing unit for processing and analyzing said detected current signals and said detecting signal;
wherein a time of completion of operation of said electromagnetically motive latch mechanism is determined by said processing unit from both said detected current signals and said detecting signal.

* * * * *